United States Patent [19]

Winter

[11] 3,834,735
[45] Sept. 10, 1974

[54] TRAILER HITCH MECHANISM

[76] Inventor: Charles M. Winter, 2580 W. Philadelphia St., York, Pa. 17404

[22] Filed: Dec. 14, 1972

[21] Appl. No.: 314,952

[52] U.S. Cl. .......................... 280/423 R, 280/476 R
[51] Int. Cl. ............................................. B62d 53/00
[58] Field of Search ............ 280/415, 476 R, 414 R, 280/423 R, 491, 435, 495

[56] References Cited
UNITED STATES PATENTS

| | | | |
|---|---|---|---|
| 2,628,106 | 2/1953 | Sturwold | 280/491 B X |
| 2,889,155 | 6/1959 | Sandage | 280/491 B |
| 3,392,992 | 7/1968 | Baker et al. | 280/435 X |
| 3,393,922 | 7/1968 | Adams | 280/423 R |
| 3,722,917 | 3/1973 | Mims | 280/423 R |

*Primary Examiner*—Leo Friaglia
*Assistant Examiner*—Randall A. Schrecengost
*Attorney, Agent, or Firm*—C. Hercus Just

[57] ABSTRACT

Hitch mechanism for attaching a fifth wheel type trailer to the rear portion of a passenger-type motor vehicle having a rear trunk, the hitch mechanism including frame means preferably detachably interconnectable to the rear portions of the chassis frame members of the motor vehicle and extending beyond the sides thereof to provide vertical frame means extending up along the exterior portions of the rear fenders and across the top of the trunk to support a fifth wheel hitch member adapted to receive the fifth wheel hitch pin on the front end of a fifth wheel trailer. When the trailer is disconnected from the hitch mechanism, the frame means extending across the top of the trunk is pivotally movable upwardly to permit the trunk cover to be raised to gain axcess to the interior of the trunk. Auxiliary supporting wheels are connected to the frame means to augment the support provided by the conventional rear wheels of the motor vehicle and supplemental hitch means may be provided on the frame for purposes of connecting a conventional trailer thereto by normal hitch means.

14 Claims, 7 Drawing Figures

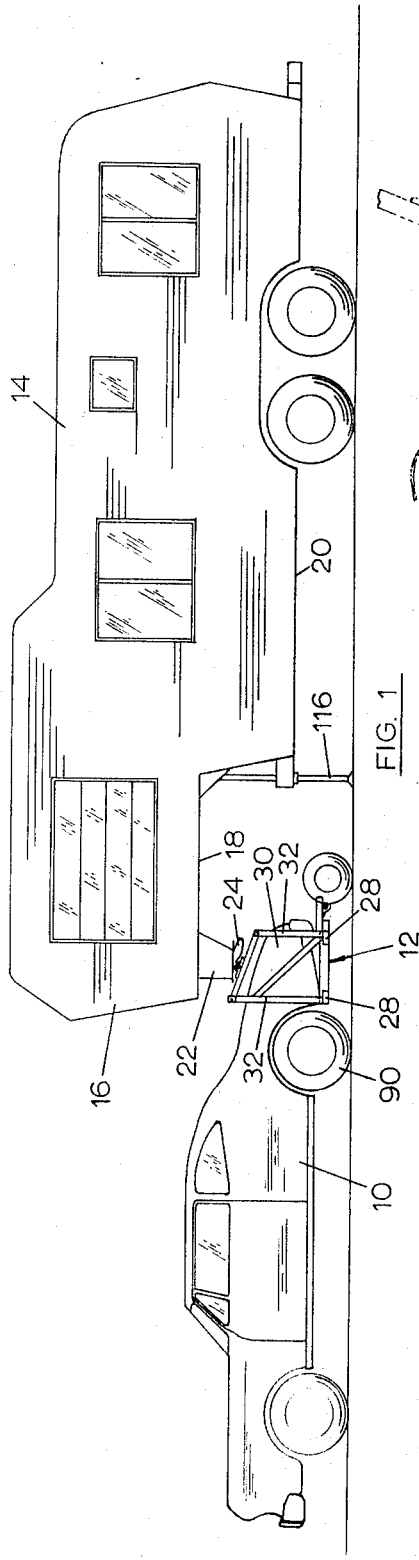
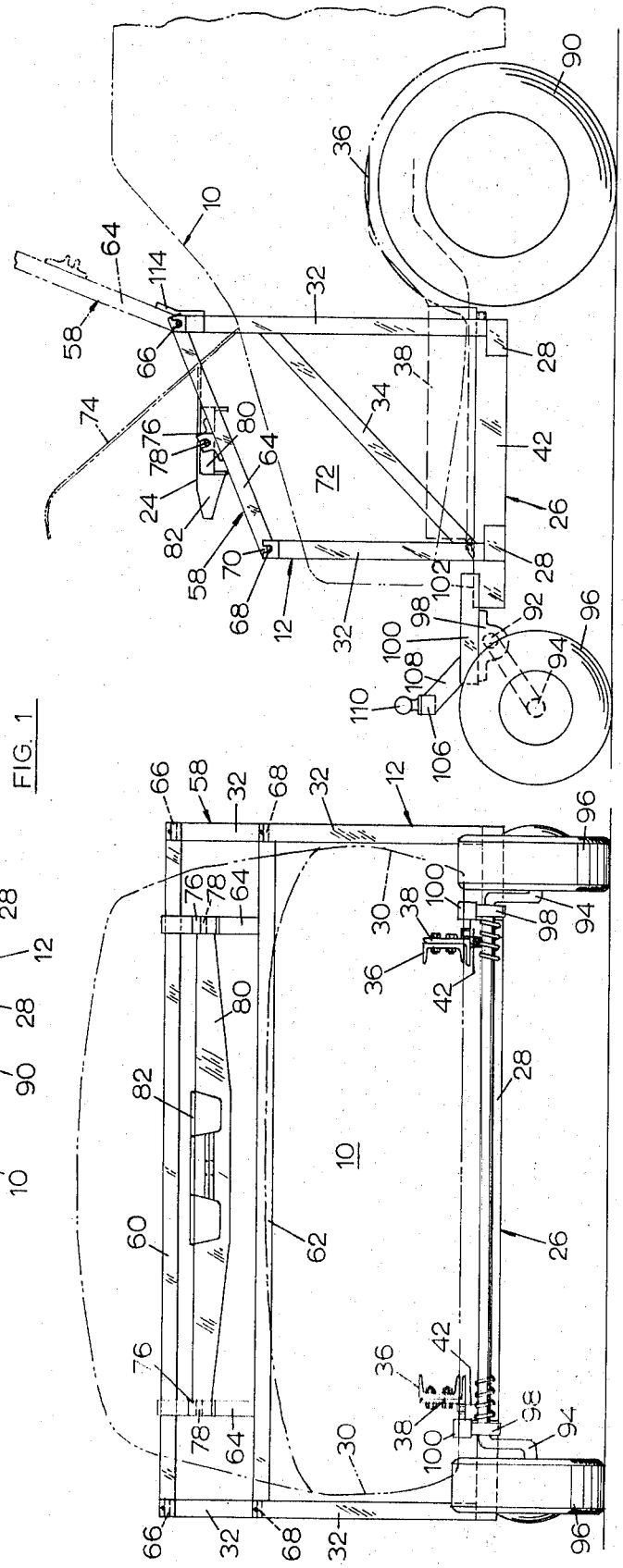

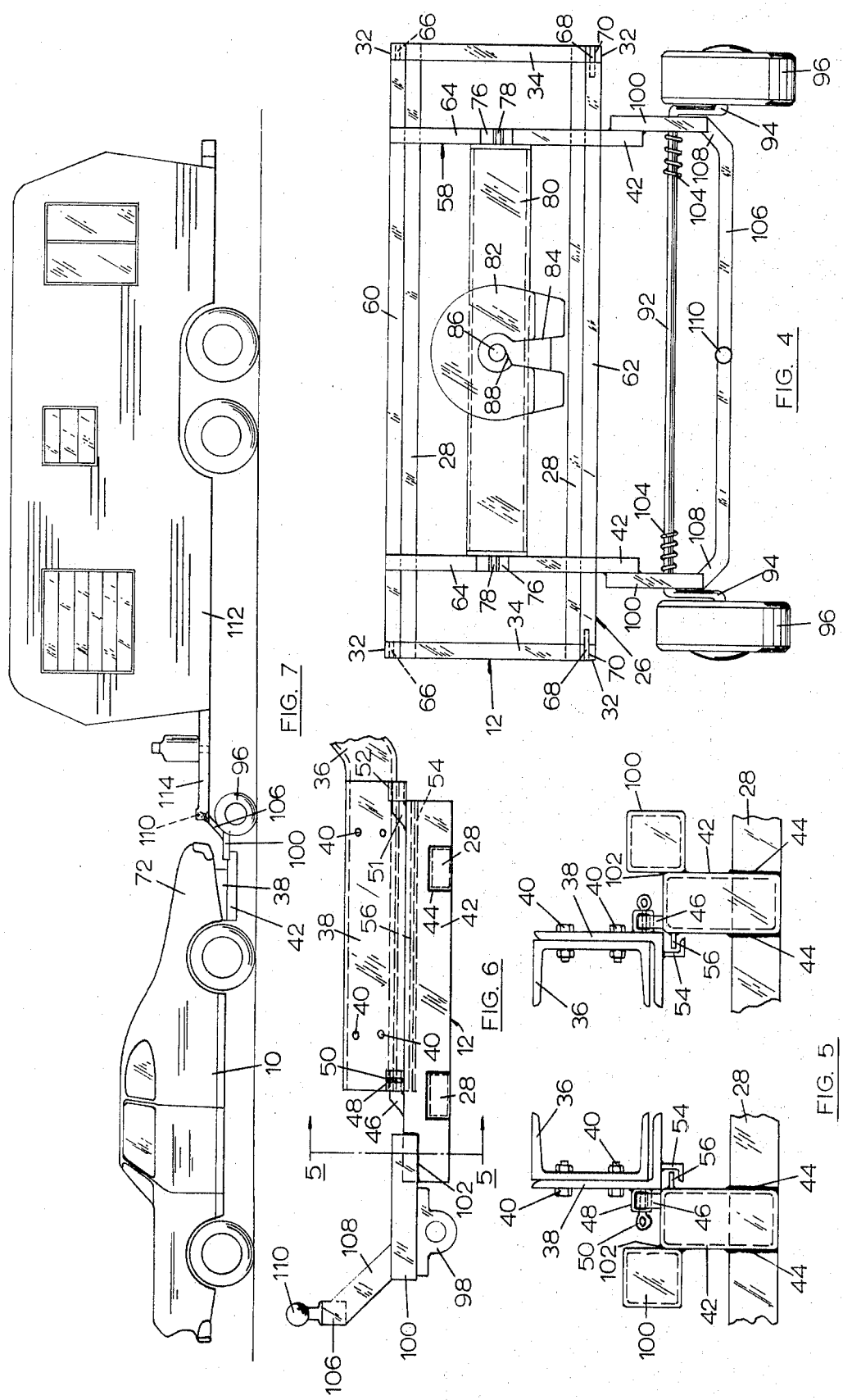

ics on the page

TRAILER HITCH MECHANISM

CROSS-REFERENCE TO RELATED APPLICATION

The present invention has certain objectives similar to those comprising the subject matter of applicants co-pending application Ser. No. 283822, filed Aug. 25, 1972 now U.S. Pat. No. 3790189, but includes different means for accomplishing said objectives, as well as additional objectives not included in said co-pending application.

BACKGROUND OF THE INVENTION

Fifth wheel type trailers are much heavier than conventional trailers and provide additional living area not present in the latter type of trailer. Some of this additional living area frequently is provided in the form of a forward extention on the trailer, the lower surface of said extention being at a subtantially higher elevation than the floor of the trailer and said lower surface supporting hitch means, including a fifth wheel hitch pin which is connected to a fifth wheel usually carried by a vehicle having more rugged supporting power than a conventional passenger-type motor vehicle for example. Accordingly, at present, it is conventional to propel fifth wheel type trailers by mounting hitch mechanism on the bed of a truck such as of the order of at least one-half ton capacity. An example of such a hitch is shown in prior U.S. Pat. No. 2925286, to Hodges et al, issued Feb. 16, 1960.

Another example of fifth wheel type trailer hitch mechanism applied to the deck or body of truck vehicles comprises the subject matter of U.S. pat. No. 3390896, to Philapy, issued July 2, 1968. Although said patent, in FIG. 4, shows a fifth wheel type trailer attached to a passenger-type vehicle, in order to accomplish this, the cover of the trunk has been modified and the trailer is a relatively light weight type which can be supported by conventional rear wheels of a passenger-type vehicle without auxiliary wheel support being provided.

The supporting capabilities of open bed type trucks are highly suited for purposes of transporting and propelling fifth wheel type trailers and especially those of substantial size which, in general, are far too heavy for the front end of the same being connected to and supported by the rear portion of a conventional passenger-type automobile, such as a sedan. The principle difficulty inherent in such an arrangement however is that only a very limited number of passengers, such as about three at the maximum, can be accomodated due to the fact, that at least in most states, passengers are prohibited by law from riding in trailers and therefore must be accomodated in the cab of the truck which, as is well known, has very limited capacity for passengers, such as a maximum of three adults. In most conventional cabs of trucks used to support fifth wheel trailers, even three adults are crowded in the cabs of the truck and therefore it is the principal purpose of the present invention to provide hitch means adapted to be connected as conveneintly as possible to the rearward portion of a conventional passenger-type motor vehicle, such as a sedan having a rear trunk, and providing the hitch mechanism with auxiliary wheel means, but the arrangement also permitting axcess to the interior of the trunk and requiring no modification of the trunk as in applicants co-pending application. In general, the objectives of the present invention are as follows;

SUMMARY OF THE INVENTION

It is the principal object of the present invention to provide a hitch mechanism which preferably is readily attachable to and detachable from the rear portion of a passenger-type motor vehicle to support a fifth wheel type trailer, said hitch mechanism including a frame attachable to the rear portion of the chassis frame member without requiring modification of the trunk of the vehicle, yet supporting the forward end of the fifth wheel trailer above the cover of the trunk.

It is another object of the invention to provide auxiliary wheel means associated with the frame means of said hitch mechanism and supported rearwardly of the conventioanl rear wheels of such vehicle by spring means permitting yieldability of said auxiliary wheels resulting from roadway conditions.

It is a further object of the invention to provide a relatively simple bracket means which preferably are fixedly connected to the rearward portions of the chassis frame means of the motor vehicle and including means by which the frame means of said hitch mechanism are readily and quickly attachable to and detachable from said bracket means and thereby restore the motor vehicle to normal appearance such as when the fifth wheel trailer and hitch mechanism is parked.

It is still another object of the invention to provide top frame means in the frame mechanism of the hitch comprising the present invention, said top frame means being arranged to support the fifth wheel of the hitch mechanism but also being pivotally movable upwardly from the rearward end thereof, when the trailer is unhitched from the mechanism, to permit normal access to the trunk of the vehicle by raising the cover thereof.

It is a still further object of the invention to provide the frame means of the hitch mechanism with an auxiliary or supplemental hitch means adapted to support a conventional trailer, the coupling ball for said conventional hitch mechanism being carried by the frame means substantially vertically in line with and above the axes of the auxiliary wheels, whereby the hitch mechanism of the present invention is adapted to support the front end of either a conventional trailer and mechanism or a fifth wheel type trailer.

It is still another object of the invention to provide auxiliary wheel support means attachable to the rearward portion of the chassis frame of a conventional passenger-type motor vehicle by utilizing a portion of the frame means employed in accordance with the invention for a fifth wheel type hitch mechanism but including a transverse member having a trailer hitch ball intermediately of the ends thereof and positioned above and vertically aligned with the axes of the auxiliary wheels of the hitch mechanism.

Details of the foregoing objects and of the invention, as well as other objects thereof, are setforth in the following specification and illustrated in the accompanying drawings comprising apart thereof.

BRIEF DESCRIPTION OF THE DRAWINGS

FIG. 1 is a side elevation of an exemplary passenger-type motor vehicle to which fifth wheel hitch mechanism embodying the present invention is connected at the rear portion thereof and also illustrating a conventional fifth wheel trailer attached to said hitch mechanism.

FIG. 2 is a rear elevation of the fifth wheel hitch mechanism shown in FIG. 1 but illustrated on a substantially larger scale than in said figure and showing the general outline of the rear end of the motor vehicle in phantom.

FIG. 3 is a side elevation of the mechanism shown in FIG. 2 and illustrating the hitch mechanism, in full line, in position to support the forward end of a fifth wheel trailer and, in phantom, showing the top frame means raised to permit elevation of the trunk cover in accordance with the principles of the invention.

FIG. 4 is a top plan view of the fifth wheel hitch mechanism illustrated in FIGS. 2 and 3.

FIG. 5 is a vertical sectional view, broken in the middle to contract the same, as seen on the line 5—5 of FIG. 6, and illustrating details of connecting means by which the frame of the fifth wheel hitch mechanism is connected to brackets attached to the rear portions of the chassis frame members of a passenger-type vehicle.

FIG. 6 is a fragmentary side elevation of the structure shown in FIG. 5 and illustrating details of the connecting means by which the hitch mechanism of the invention is attached to brackets on the rear portion of the chassis frame members of the vehicle.

FIG. 7 is a view similar to FIG. 1 but showing a conventional type trailer connected to a modified version of the hitch mechanism embodying details of the structure shown in FIGS. 3 and 4, eliminating the auxiliary frame means of the hitch mechanism shown in the preceding figures.

DETAILED DESCRIPTION

Referring to FIG. 1, an exemplary, conventional passenger-type motor vehicle 10 is illustrated in side elevation which has attached thereto hitch mechanism embodying principles of the present invention by which a fifth wheel type trailer 14 is connected at its forward end to the hitch mechanism 12. Said fifth wheel type trailer 14 is illustrated as being of the type which will accomodate a larger number of persons than normally can comfortably be accomodated in the cab of a pickup truck of the type which is conventionally used to propel fifth wheel type trailers of the type illustrated in FIG. 1. One of the advantages of a fifth wheel type trailer 14 such as shown in FIG. 1 is that the forward end 16 thereof comprises additional sleeping space. The lower surface 18 thereof is at a higher elevation than the bottom 20 of the main portion of the trailer 14, whereby the surface 18 comprises an ideal location to mount a supporting block 22 from which the conventional fifth wheel hitch pin, not shown, projects downwardly for engagement with the fifth wheel 24 which is supported by the hitch mechanism 12 in accordance with the principles of the invention, as described hereinafter.

In applicants co-pending application ser. No. 283,822, referred to above, the hitch mechanism is connected to the chassis frame of the passenger-type motor vehicle by being disposed within the trunk compartment of the vehicle. The mechanism has projections which extend through the floor of the trunk and are connected directly to the chassis frame members. Such arrangement provides a sturdy and very satisfactory means for supporting the forward end of a fifth wheel trailer by the rear portion of the motor vehicle.

However, under circumstances where it is desired to utilize the entire trunk for luggage purposes and the like, the arrangement of the hitch mechanism in said co-pending application is less desirable than that provided by the present invention in which the interior of the trunk of the vehicle is not affected in any way by the hitch mechanism 12 in view of the fact that all portions thereof are exterior of the rear portion of the motor vehicle, details of which are as follows.

Hitch mechanism 12 comprises a base frame 26 consisting preferably of a pair of cross members 28 which, for convenience and adequate strength, may comprise steel tubes which are either square or rectangular in cross section. As best shown in FIG. 2, the cross members 28 extend beyond the outer surfaces of the rear fenders 30 of the vehicle 10 for purposes of vertical auxiliary frame members 32 being connected thereto. As shown in FIG. 3, the rearward members 32 are shorter than the forward members and angularly extending brace members 34 are connected particularly to the upper portions of the forward members 32 at each side of the hitch mechanism 12 in a manner to resist rearward inclination imposed upon the hitch mechanism when towing the trailer 14.

Referring to FIGS. 5 and 6, it will be seen that the base frame 26 is connected, preferably detachably, to the chassis frame members 36 of the vehicle 10 by means of brackets 38 which, for example, comprise predetermined lengths of structural channels. The vertical flange of each channel is provided with suitable holes aligned with corresponding holes in the chassis frame members 36 to receive a plurality of connecting bolts 40. Under the circumstances, the brackets 38 remain fixedly connected to the chassis members 36 when the hitch mechanism 12 is disconnected from the vehicle but in view of the fact that said brackets are hidden by the rear fenders of the vehicle, the vehicle has no appearance of any trailer hitch mechanism being connected thereto when the mechanism 12 is separated therefrom in the manner described hereinafter.

Base frame 26 also comprises a pair of connecting members 42 which, for convenience and adequate strengh, also comprise suitable sizes of steel tubing of square or rectangular configuration, as best shown in FIG. 5. Appropriate cutouts are formed in the lower portions of the connecting members 42 to receive the cross members 28, as shown in FIG. 6. Connection between members 42 and 28 preferably is made by means of weldments 44. Accordingly, the connecting members 42 secure the cross members 28 in parallel, spaced relationship with respect to each other in a direction parallel to the chassis frame members 36. Connecting members 42 preferably are connected to the brackets 38 by readily detachable means comprising pins 46 which are secured by welding or the like to the upper surface of the connecting members 42 for reception within complementry socket members 48. Transversely extending securing pins 50 extend through aligned holes in the pins 46 and sockets 48 and preferably are secured against accidental removal by any appropriate means such as threading, or otherwise. Members 48 are fixed to brackets 38.

The forward ends of the connecting members 42 are positioned against vertical or horizontal movement relative to the brackets 38 by means of additional pins 51 which are fixed to the upper surface of connecting members 42 and slidably fit into complementary socket members 52 welded or otherwise secured to the brackets 38.

To facilitate guiding the connecting members 42 into supporting relationship with brackets 38, the lower surfaces of the brackets have elongated structural angles 54 welded thereto to form longitudinal guide channels which slidably receive elongated ribs 56 which are welded to the inner faces of connecting members 42 and project laterally therefrom for slidable engagement with the lower flanges of the angles 54 and thereby facilitate the guiding of pins 46 and 51 into slidable reception within socket members 48 and 52. Such arrangement comprises affective and readily operated mechanism for operatively positioning the hitch mechanism 12 relative to the chassis channel members of the motor vehicle 10.

The upper portion of hitch mechanism 12 comprises a top frame 58 which also may be considered a fifth wheel hitch frame. Said top frame 58 comprises a pair of parallel transversely extending members 60 and 62 which also may be formed from tubular metal of suitable transverse cross section. The member 60 may be considered the forward member and the member 62 the rearward member of top frame 58. The members 60 and 62 are substantially of the same length as the cross members 28 of base frame 26 and the same are held in spaced ralationship by means of end members 64 which also may be formed from similar metal tubular means such as members 60 and 62. The ends of the end members 64 are connected to the transverse members 60 and 62 by any suitable means such as welding.

The outer ends of the forward transverse members 60 are pivotally connected to the upper ends of the forward vertical frame members 32 by pivot pins 66 which fit in appropraite holes in said upper ends of members 32. The opposite ends of the rearward transverse member 62 also have longitudinally extending positioning pins 68 therein which are received in open-ended notches 70 provided in the upper ends of the rearward vertical frame members 32 as clearly shown in FIGS. 3 and 4.

From FIG. 3, it will be seen that the top frame 58 extends above and across the trunk 72 of vehicle 10 which is outlined in said FIG. 3. By means of the pivotal mounting of top frame 58 as described above, when it is desired to gain access to the interior of trunk 72, frame 58 may be elevated for example, to the phantom position shown in FIG. 3, whereupon the cover 74 of the trunk may be freely exposed and be raised to open position as shown in phantom in FIG. 3. Accordingly, the trunk 72 may be used for its normal purposes and not be encumbered in any way by the hitch mechanism 12 comprising the present invention.

Top frame 58, which also is the fifth wheel supporting frame, includes a pair of cradles 76 which are connected to end member 64 of said frame and open upwardly for purposes of respectively receiving the trunnion pins 78 which are fixed to the opposite ends of the fifth wheel bar 80. Intermediately of the bar 80, a conventional fifth wheel 82 is supported for limited rocking movement about the axes of the trunnion pins 78. The fifth wheel 82 has a conventional entry slot 84 which receives a fifth wheel pin in the central opening 86 thereof. A conventional latch 88 is provided in the fifth wheel to secure the pin thereto when a trailer is connected to the hitch mechanism 12.

To offset the added weight of the fifth wheel trailer which is imposed upon the normal rear wheels 90 of motor vehicle 10, as well as the springs by which the wheels and their axle are connected to the chassis frame members 36, the present invention also includes an auxiliary axle 92 which has pivotal ends 94 laterally offset from the intermediate portion of axle 92. The pivotal ends rotatably support auxiliary wheels 96 having pneumatic tires thereon. Th opposite ends of the intermediate portion of auxiliary axle 92 extend through appropriate bearing 98 which are connected to horizontal extensions 100 which extend along portions of connecting members 42 and to which they are connected by suitable weldments 102.

From FIG. 3, it will be seen that the normal operative position of the auxiliary wheels 96 relative to the conventional rear wheels 90 of the vehicle is rearward of the hitch mechanism 12. The lateral extensions between the offset pivotal ends 94 and the intermediate portion of auxiliary axle 92 are directed downward and rearward as can be seen in FIG. 3. To support the wheels 96 in said preferred operative position and also to enable them to absorb shock imposed from contact with roadways and the like, resilient means in the form of strong coiled springs 104 surround the axle 92. One end of each spring is fixedly connected to the axle, such as by welding, and the opposite end of each spring respectively is connected to the adjacent horizontal extension 100. The rated capacity of the springs 104 is quite substantial and, for example, of the order of approximately one thousand pounds each. This indication is intended to be exemplary rather than restrictive however because the strength of said springs is selected to correspond to the weights to be sustained by the wheels 96.

By reason of the extensions 100 being fixedly connected to connecting members 42 and the latter being securely fastened to brackets 38 which, in turn, are fixedly attached to the chassis frame members 36, it will be seen that the auxiliary axle 92 is interconnected to the chassis frame members 36 to furnish supplemental wheel support to the chassis of the vehicle and thereby substantially augment the supporting ability of the conventional rear wheels 90 and the springs by which they are connected to said chassis.

Under some circumstances, it may be desirable to connect a conventional trailer having conventional hitch socket means to the hitch mechanism 12 comprising the present invention. Accordingly, the present invention includes such additional or supplemental hitch means in the form of a transversely extending support bar 106, the opposite ends 108 of which are bent downwardly and forwardly and the terminal ends thereof are secured by welding or otherwise to the upper surfaces of the horizontal extensions 100, as clearly shown in FIGS. 4 and 6. The terminal surfaces of the opposite ends 108 of support bar 106 may be secured effectively to the horizontal extensions 100 by welding or any other suitable means.

Intermediately of the ends of support bar 106 is a trailer hitch ball 110 of conventional type and to which the socket on the forward end of a conventional trailer 112, such as shown in FIG. 7, is connected. Conventional trailers normally have a forward tongue 114 and said socket is connected to the forward end thereof.

Further in accordance with the present invention, and with reference to FIG. 7, it will be seen that it is not necessary to use the entire structure of the hitch mechanism 12 and especially the superstructure thereof which extends across the top of the trunk 72 when utilizing the conventional trailer hitch comprising ball 110 and the bar 106 which supports the same. Accordingly, by utilizing the brackets 38 which are fixedly connected to the rearward portion of the chassis frame members 36 and the connecting members 42, the auxiliary wheels 96 will be made available for use with the conventional trailer hitch ball 110 and its supporting means for purposes of towing the conventional type trailer 112. Under such circumstances however, and in view of the supplemental wheel support afforded by the auxiliary wheels 96, conventional trailers of heavier type than normal may to towed by a conventional passenger-type vehicle 10.

One of the important features of the support bar 106 and the ball 110 supported thereby is that, as seen from both FIGS. 3 and 4, said ball is substantially within a vertical plane passing commonly through the pivotal ends 94 of auxiliary axle 92. This arrangement provides maximum stability in towing a conventional type trailer so as to minimize or absolutely prevent whiplashing.

Although the provision of the fifth wheel type hitch mechanism 12 and the supplemental trailer hitch ball 110 for a conventional trailer may appear to be redundant, said arrangement nevertheless provides convenience such as, for example, when the owner of a fifth wheel type trailer may have reached a destination and the trailer is unhitched for living purposes for a certain duration of time. In the event the owner of the vehicle desires to tow a boat trailer or a conventional trailer for any purposes such as to rent the use of his vehicle for such hauling purposes or use it himself for such purposes, he may do so. When using the fifth wheel type hitch mechanism 12 for purposes of towing a fifth wheel type trailer, the provision of the trailer hitch ball 10 offers no inconvenience or impedance but nevertheless is always for use, if desired.

The modified type of hitch shown in FIG. 7 for attaching a conventional trailer to the ball member 110 preferably is connected to the chassis of the vehicle by employing the connecting members 42 on the frame means for the hitch and detachably connecting this to the brackets 38 referred to above in regard to the preceding embodiments of the invention. Further, although the figures of the drawings illustrate the auxiliary wheels as being spaced apart substantially a similar distance to the spacing of the rear wheels of the vehicle, it is to be understood that, within the spirit and intent of the invention, that said auxiliary wheels 96 may be spaced closer together, if desired and, therefore, the invention is not to be restricted to the spacing of said wheels which is shown in the drawings.

From the foregoing, it will be seen that the present invention provides a hitch mechanism for a fifth wheel type trailer which readily and quickly may be attached to or detached from a rearward portion of a conventional passenger-type motor vehicle. All portions of the hitch mechanism are exterior of the rear portion of the vehicle and in no way interfere with the normal use of the trunk compartment. Further, simply by disconnecting the fifth wheel trailer 20 from the hitch mechanism 12 and supporting it upon conventional stanchions 116 which are retractably carried by the trailer 20, the vehicle may be moved forward and the top frame 58 of the hitch mechanism may be pivoted upwardly in the manner shown in phantom in FIG. 3 and thus permit raising the trunk cover 74 for access to the interior of the trunk 72 of the vehicle. Stops 114 limited such movement.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A hitch mechanism for attaching a fifth wheel type trailer to the rear portion of a passenger-type motor vehicle having a rear trunk, said hitch mechanism comprising in combination:
    a. base frame means interconnectable fixedly to the chassis frame of said passenger-type vehicle below the rearward portion thereof, the length of said base frame means being greater than the exterior width of said vehicle between the rear fenders thereof, whereby the ends of said frame means project beyond said rear fenders when said frame means is attached to said vehicle,
    b. auxiliary frame means connected to the outer ends of said base frame means and including vertical members extending upwardly therefrom and also additional cross frame members extending between the upper ends of said vertical members and thereby extend at least partially over said rear trunk, and
    c. a fifth wheel hitch supported by said additional members of said auxiliary frame means intermediately of the ends thereof to position the hitch above the cover of said rear trunk of said motor vehicle for connection of the fifth wheel pin of a fifth wheel trailer thereto for support of the forward end of such trailer by said motor vehicle above the rear trunk thereof.

2. The hitch mechanism according to claim 1 in which at least one of said cross frame members is movable upwardly when said trailer is detached from said hitch mechanism and thereby permit the trunk cover of said vehicle to be raised and permit access to the interior of the trunk.

3. The hitch mechanism according to claim 2 in which said cross frame members are connected together to form a top frame, and including means to pivotally connect said top frame to said vertical auxiliary frame and thereby permit raising of said top frame and the fifth wheel hitch supported thereby to permit said access to the interior of the trunk.

4. The hitch mechanism according to claim 2 further including supplementary frame members extending transversely between said cross frame members in directions parallel to the longitudinal axis of the vehicle, said supplementary frame members being spaced apart and comprising a fifth wheel support and a fifth wheel assembly extending between said supplementary frame members and supported thereby generally in parallel relationship to said cross frame members.

5. The hitch mechanism according to claim 4 further including cradle means on said supplementary frame members respectively adapted to pivotally receive the opposite ends of a transverse bar of said fifth wheel assembly and thereby permit flexibility between said vehicle and a trailer towed thereby.

6. The hitch mechanism according to claim 1 further including brackets connectable fixedly to the chassis frame members of said vehicle, and quick-disconnectable means arranged to interconnect said base frame means to said brackets.

7. The hitch mechanism according to claim 6 further characterized by said base frame means including a pair of cross-members spaced transversely apart and removably connectable to said brackets by said quick-disconnectable means, said vertical members of said auxiliary frame means respectively being connected to and extending upward from the opposite ends of said cross-members, and braces connected between said upright frame members to fixedly position and brace the same relative to each other.

8. A hitch mechanism for attaching a fifth wheel type trailer to the rear portion of a passenger type vehicle above the cover of said trunk, said mechanism comprising in combination;
  a. cross-means comprising a pair of elongated structural members adapted to extend beneath and across the chassis frame members of said vehicle and the ends thereof extending beyond said frame members substantially at least in vertical alignment with and below the exterior surfaces of the rear fenders of said vehicle.
  b. attaching members interconnecting said structural members to the rearward portions of said chassis frame members beneath said trunk,
  c. auxiliary frame means extending upwardly from the ends of said structural members and across the cover of said trunk,
  d. fifth wheel hitch mechanism supported by the upper part of said auxiliary frame means above said cover of said trunk of the vehicle,
  e. auxiliary axle means interconnected to said attaching members for support thereby and extending parallel to said structural members, and
  f. auxiliary support wheels supported by the opposite ends of said auxiliary axle means and operable to augment the supporting ability of the conventional rear wheels of said vehicle to sustain the added weight of the forward portion of a trailer when connected to said hitch mechanism.

9. The hitch mechanism according to claim 8 further including brackets adapted to be fixedly connected to the rearward portions of the chassis frame members of said vehicle, and said attaching members of said mechanism being attachable to said brackets to secure the hitch mechanism to said chassis frame members of said vehicle.

10. The hitch mechanism according to claim 8 in which said auxiliary axle means is positioned in said mechanism rearwardly of said structural members.

11. The hitch mechanism according to claim 10 in which said auxiliary axle has pivot ends normally extending outward and downward from the intermediate portion of said axle.

12. The hitch mechanism according to claim 8 further including interfitting pin and socket connecting means adapted to interconnect said attaching members to said chassis frame members of a vehicle, and further including quick-detachable pin means to secure said pin and socket connecting means together and prevent separation thereof until disconnection of said hitch mechanism from said vehicle is desired.

13. The hitch mechanism according to claim 12 further including bracket means adapted to be fixedly connected to the chassis frame members of a vehicle and said pin and socket connecting means being fixed to said bracket means and attaching members for interfitting relationship there between.

14. The hitch mechanism according to claim 13 further characterized by sets of said interfitting pin and socket connecting means being spaced respectively longitudinally along said attaching members and the axes of said pin and socket connecting means being parallel to the longitudinal axis of said vehicle.

* * * * *